United States Patent
Kim et al.

(10) Patent No.: US 11,858,604 B2
(45) Date of Patent: Jan. 2, 2024

(54) METHOD FOR INSTALLING OFFSHORE FLOATING BODY FOR WIND POWER GENERATION

(71) Applicant: ACE E&T (ENGINEERING & TECHNOLOGY), Ulsan (KR)

(72) Inventors: Day Hwan Kim, Ulsan (KR); Soo Han Kim, Ulsan (KR)

(73) Assignee: ACE E&T (ENGINEERING & TECHNOLOGY), Ulsan (KR)

( * ) Notice: Subject to any disclaimer, the term of this patent is extended or adjusted under 35 U.S.C. 154(b) by 355 days.

(21) Appl. No.: 17/438,654

(22) PCT Filed: Nov. 24, 2020

(86) PCT No.: PCT/KR2020/016679
§ 371 (c)(1),
(2) Date: Sep. 13, 2021

(87) PCT Pub. No.: WO2022/059847
PCT Pub. Date: Mar. 24, 2022

(65) Prior Publication Data
US 2022/0306251 A1    Sep. 29, 2022

(30) Foreign Application Priority Data

Sep. 16, 2020    (KR) .................. 10-2020-0119068

(51) Int. Cl.
*B63B 77/10*     (2020.01)
*F03D 13/10*     (2016.01)
(Continued)

(52) U.S. Cl.
CPC ............ *B63B 77/10* (2020.01); *B63B 35/003* (2013.01); *B63B 35/44* (2013.01); *F03D 13/10* (2016.05);
(Continued)

(58) Field of Classification Search
CPC ....... B63B 77/10; B63B 35/003; B63B 35/44; B63B 2035/446; F03D 13/10;
(Continued)

(56) References Cited

U.S. PATENT DOCUMENTS

| 7,086,809 B2 * | 8/2006 | Busso ................. B63B 35/4413 |
| | | 405/203 |
| 10,087,915 B1 * | 10/2018 | Srinivasan .............. F03D 13/25 |
| 2010/0263581 A1 * | 10/2010 | Khachaturian ......... B63B 27/12 |
| | | 114/61.16 |

FOREIGN PATENT DOCUMENTS

| KR | 10-2016-0016390 A | 2/2016 |
| KR | 10-2016-0037693 A | 4/2016 |

(Continued)

*Primary Examiner* — Stephen P Avila
(74) *Attorney, Agent, or Firm* — The PL Law Group, PLLC

(57) ABSTRACT

A method for installing an offshore wind power generation floating body may include manufacturing a lower structure including a damping plate, a guide beam including protruding portions, and a slot, coupling a temporary buoyancy tank to each protruding portion, installing a concrete block mounting structure in the slot, transporting the lower structure on the sea until a destination by a towing vessel, fixing the lower structure between a first work barge and a second work barge by a link bridge connected to each of the first work barge and the second work barge, and seating a concrete block connected to a second wire of a second crane seated on the second work barge on the concrete block mounting structure in a state in which first wires of a first crane are connected to the lower structure to maintain a tension equal to or greater than a set magnitude.

10 Claims, 14 Drawing Sheets

(51) Int. Cl.
    *F03D 13/25*     (2016.01)
    *F03D 13/40*     (2016.01)
    *B63B 35/00*     (2020.01)
    *B63B 35/44*     (2006.01)

(52) U.S. Cl.
    CPC ............. *F03D 13/25* (2016.05); *F03D 13/40* (2016.05); *B63B 2035/446* (2013.01); *F05B 2230/6102* (2013.01); *F05B 2240/95* (2013.01); *F05B 2240/97* (2013.01)

(58) Field of Classification Search
    CPC .. F03D 13/25; F03D 13/40; F05B 2230/6102; F05B 2240/97; F05B 2240/95
    See application file for complete search history.

(56) References Cited

FOREIGN PATENT DOCUMENTS

WO     WO 2014/073956 A1     5/2014
WO     WO 2019/088324 A1     5/2019

\* cited by examiner

METHOD FOR INSTALLING OFFSHORE FLOATING BODY FOR WIND POWER GENERATION

PRIORITY

This application claims benefit under 35 U.S.C. 119(e), 120, 121, or 365(c), and is a National Stage entry from International Application No. PCT/KR2020/016679, filed Nov. 24, 2020, which claims priority to the benefit of Korean Patent Application No. 10-2020-0119068 filed in the Korean Intellectual Property Office on Sep. 16, 2020, the entire contents of which are incorporated herein by reference.

BACKGROUND

1. Technical Field

Embodiments of the present invention relates to a technology for installing an offshore wind power generation floating body.

2. Background Art

In general, the wind power generation converts wind energy into mechanical energy by using a device such as a wind turbine, and operates a generator to produce electricity by using this energy. Here, the wind power generation is classified into an onshore-type wind power generation and an offshore-type wind power generation according to an installation place of the wind power generator. In recent years, among the wind power generations, researches and developments on a floating-type marine wind power generation having a lower structure that is floating on the sea instead of being fixed to a seafloor are actively performed.

Since an offshore wind power generation floating body requires a center of gravity to be disposed lower than a center of buoyancy for safety of the floating body, water or solid ballast is filled into the floating body. In this case, as the center of gravity of the floating body is lower than the center of buoyancy, the floating body is easily restored although inclined by waves. However, since a typical offshore wind power generation floating body has a deep draft (i.e., a depth by which the floating body is submerged into water), the long offshore wind power generation floating body is difficult to be towed and transported on the sea in a standing state until an installation place when a water depth of seawater is restricted.

SUMMARY

Embodiments of the present invention provide an offshore wind power generation floating body that is easily assembled regardless of a water depth of seawater.

According to an embodiment, a method for installing offshore wind power generation floating body includes steps of: manufacturing a lower structure comprising a damping plate having a circular plate shape, a guide beam configured to support each of a top surface and a bottom surface of the damping plate and comprising a plurality of protruding portions formed on a side surface of the damping plate, and a slot for fixing an upper structure, which is formed in the top surface of the damping plate and has an empty space at a central portion thereof; coupling a temporary buoyancy tank to each of the plurality of protruding portions; installing a concrete block mounting structure in the empty space of the slot for fixing the upper structure; transporting the lower structure on the sea until a destination by a towing vessel; fixing the lower structure between a first work barge and a second work barge by a link bridge connected to each of the first work barge and the second work barge; and seating a concrete block connected to a second wire of a second crane seated on the second work barge on the concrete block mounting structure in a state in which a plurality of first wires of a first crane seated on the first work barge are connected to the lower structure to maintain a tension equal to or greater than a set magnitude.

The step of coupling the temporary buoyancy tank to each of the plurality of protruding portions may include steps of: coupling a slot for coupling, which couples the temporary buoyancy tank to the protruding portion having a H-beam shape; installing a rod on an outer surface of the temporary buoyancy tank; forming an impact absorbing plate for fixing the temporary buoyancy tank on the outside of the rod; inserting the rod to the slot for coupling; and folding a folding-type blocking plate in one direction, which is formed below the rod so that the temporary buoyancy tank is not escaped from the slot for coupling.

The step of installing the concrete block mounting structure in the empty space of the slot for fixing the upper structure may include steps of: seating the concrete block mounting structure in the empty space; coupling a plurality of base anchors protruding from the top surface of the damping plate with anchor bolts after passing through the concrete block mounting structure; and filling mortar into the concrete block mounting structure.

The concrete block mounting structure may have a cylindrical shape having an opened upper portion, and a plurality of connection plates, which are spaced apart from each other, may be formed on an outer surface of the concrete block mounting structure.

The step of fixing the lower structure by the link bridge may fix the lower structure by the link bridge as one end of the link bridge, which protrudes from the first work barge, and the other end of the link bridge, which protrudes from the second barge, are coupled to the connection plates, respectively.

A spring structure for relieving an impact caused by a wave may be installed on each of one end and the other end of the link bridge.

The method may further include steps of: after the step of seating the concrete block on the concrete block mounting structure, releasing coupling between the connection plates and the one end and the other end of the link bridge; allowing the first work barge and the second work barge to sink by a ballast for work height adjustment of the first work barge and the second work barge; and coupling the upper structure having a shape corresponding to the concrete block mounting structure with the concrete block mounting structure.

The step of coupling the upper structure with the concrete block mounting structure may couple the upper structure with the concrete block mounting structure as a plurality of connection structures formed on an outer surface of the upper structure are assembled with the connection plates.

The method may further include steps of: after the step of coupling the upper structure with the concrete block mounting structure, removing the temporary buoyancy tank through the second wire of the second crane; and allowing the upper structure and the lower structure to sink below a seawater surface as a tension of the first wire of the first crane is released.

The method may further include steps of: after the step of coupling the upper structure with the concrete block mounting structure, connecting a plurality of third wires to an outer surface of the upper structure; connecting the third wire to each of a plurality of towing vessels; and adjusting a tension of the third wire by the towing vessel connected with the third wire to maintain standing of each of the upper structure and the lower structure while the upper structure and the lower structure sink below the seawater surface.

According to an embodiment of the present invention, as the temporary buoyancy is provided to the lower structure by coupling the temporary buoyancy tank with the lower structure including the damping plate, and the temporary buoyancy tank is removed after the lower structure and the upper structure are coupled, the offshore wind power generation floating body may be easily installed on the sea. Particularly, according to an embodiment of the present invention, the offshore wind power generation floating body that is long in one direction may be easily assembled in a condition in which the water depth of seawater is restricted.

DETAILED DESCRIPTION

Hereinafter, preferred embodiments of the present invention will be described with reference to the accompanying drawings. Hereinafter, in the following description, specific details such as a method, a device, and/or a system are described to provide more general understandings of the present invention. However, this is merely an example, and the embodiments of the present invention are not limited thereto.

Moreover, detailed descriptions related to well-known functions or configurations will be ruled out in order not to unnecessarily obscure subject matters of the present invention. Also, terms used in this specification are terms defined in consideration of functions according to embodiments, and thus the terms may be changed according to the intension or usage of a user or operator. Therefore, the terms should be defined on the basis of the overall contents of this specification. It will be understood that although the terms are used herein to describe various embodiments of the present inventions and should the embodiments not be limited by these terms. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Figure 1:
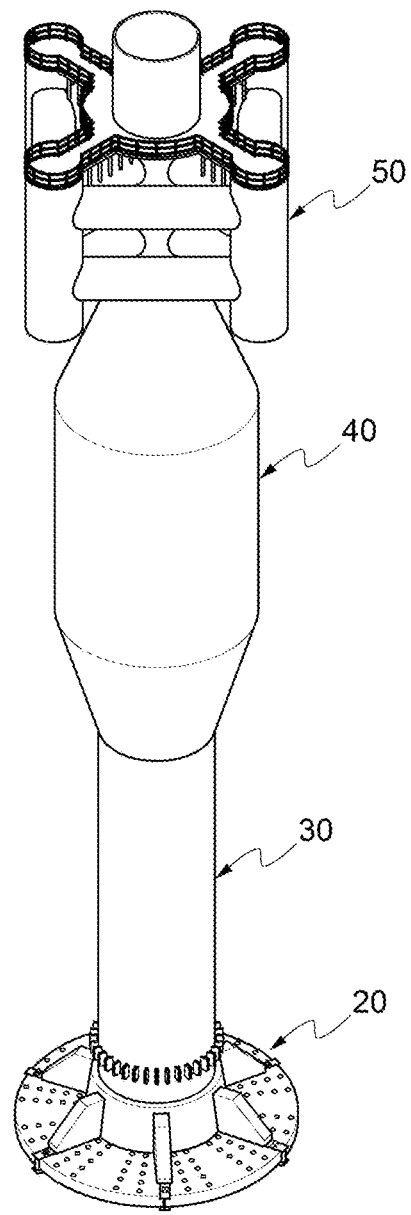
FIG. 1 is a view illustrating an offshore wind power generation floating body according to an embodiment of the present invention.

FIG. 1 is a view illustrating an offshore wind power generation floating body 10 according to an embodiment of the present invention. As illustrated in FIG. 1, the offshore wind power generation floating body 10 according to an embodiment of the present invention includes a lower structure 20, an upper structure 30, a liquid ballast part 40, and a column 50 for buoyancy.

The lower structure 20, as a structure disposed at a lowermost end of the offshore wind power generation floating body 10, includes a damping plate, a guide beam, and a slot for fixing the upper structure. For example, the lower structure 20 may be made of a solid such as concrete.

The upper structure 30 may be disposed on an upper end of the lower structure 20. For example, the upper structure 30, as a solid ballast part, may be formed by a rigid body made of a concrete material. Also, the upper structure 30 may have a hollow cylinder shape. As will be described later, a concrete block may be filled into the upper structure 30, and thus the marine wind power generation floating body 10 may have a center of gravity, which is positioned at a lower side thereof. In this case, as a draft depth of the offshore wind power generation floating body 10 increases, the center of gravity may be positioned lower than a center of buoyancy.

The liquid ballast part 40 is a structure disposed on an upper end of the upper structure 30. The liquid ballast part 40 may have a cylindrical shape having an empty inside, and liquid such as water may be filled in the liquid ballast part 40. Also, the liquid ballast part 40 may be formed to be inclined so that an outer diameter of a cross-section thereof gradually decreases in directions toward one end and the other end thereof. The offshore wind power generation floating body 10 may further damp a vertical heaving through the liquid ballast part 40 in addition to the above-described upper structure 30. Also, the inclined structure of one end and the other end of the liquid ballast part 40 may distribute an external force acting in a horizontal direction of the offshore wind power generation floating body 10 along an inclined surface thereof to damp even a horizontal pitching and rolling when the offshore wind power generation floating body 10 in a standing state is inclined.

The column 50 for buoyancy may be disposed on an upper end of the liquid ballast part 40. The column 50 for buoyancy may be positioned at a water plane on an upper side of the offshore wind power generation floating body 10, and through this, the horizontal pitching and rolling when the offshore wind power generation floating body 10 may be damped.

Hereinafter, a method for installing the offshore wind power generation floating body 10 will be described in more detail.

A Step of Manufacturing the Lower Structure 20

Figure 2:
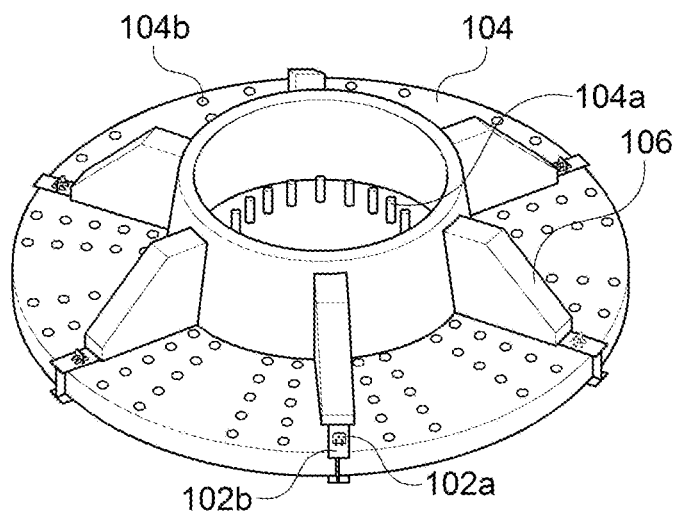
FIG. 2 is a view illustrating a lower structure manufactured according to an embodiment of the present invention.
Figure 3:
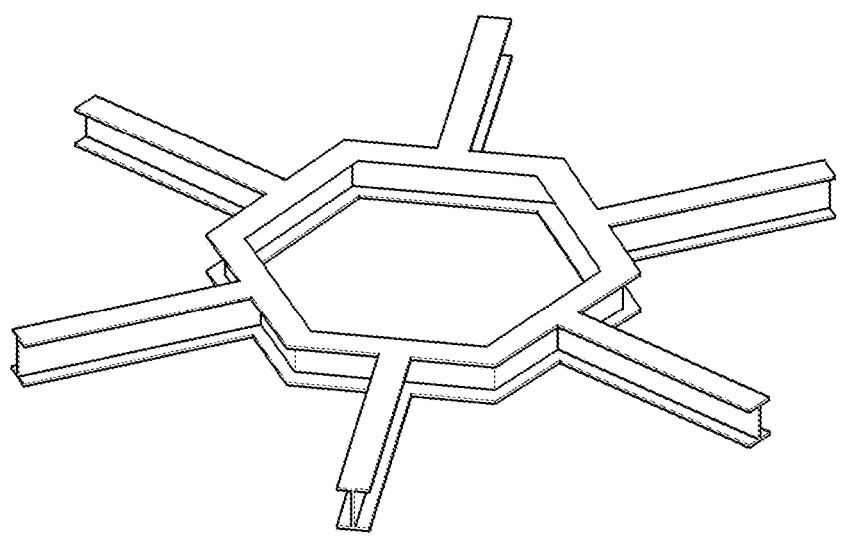
FIG. 3 is a view illustrating a guide beam according to an embodiment of the present invention.
Figure 4:
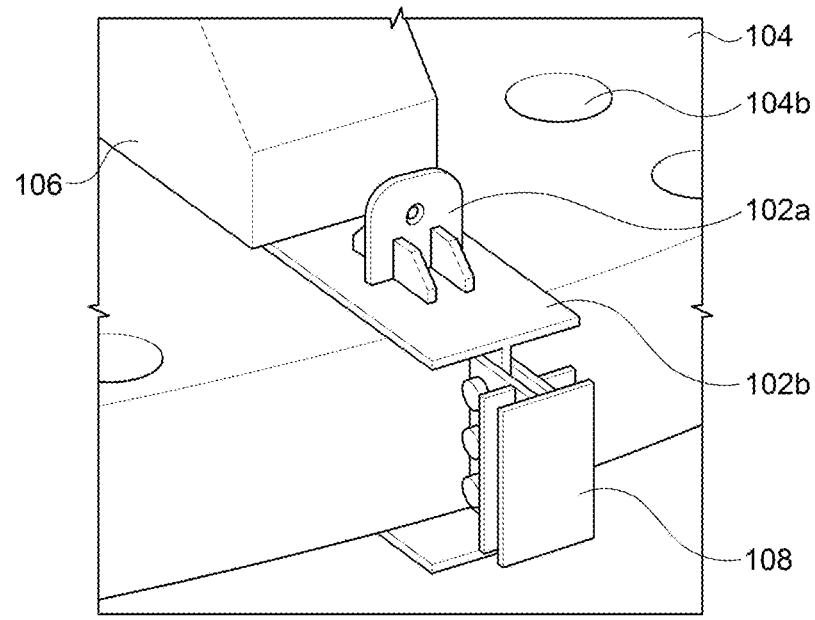
FIG. 4 is a view illustrating a slot for coupling according to an embodiment of the present invention.

FIGS. 2 to 4 are views for explaining a step of manufacturing the lower structure 20 according to an embodiment of the present invention. Specifically, FIG. 2 is a view illustrating the lower structure 20 manufactured according to an embodiment of the present invention, FIG. 3 is a view illustrating the guide beam 102 according to an embodiment of the present invention, and FIG. 4 is a view illustrating the slot 108 for coupling (hereinafter, referred to as the coupling slot 108) according to an embodiment of the present invention.

As illustrated in FIGS. 2 to 4, the lower structure 20 according to an embodiment of the present invention includes a guide beam 102, a damping plate 104, and a slot 106 for fixing the upper structure. Each of the guide beam 102, the damping plate 104, and the slot 106 for fixing the upper structure may be manufactured by reinforcing a steel bar.

The guide beam 102 is a structure for supporting the damping plate 104 and used for installing a temporary buoyancy tank 110 that will be described later. The guide beam 102 may support each of a top surface and a bottom surface of the damping plate 104 and include a towing padeye 102a and a plurality of protruding portions 102b.

The towing padeye 102a, as a padeye to which a wire for towing the lower structure 20 is connected, may be formed at one end of the protruding portion 102b. The towing padeye 102a may be welded to be fixed to one end of the protruding portion 102b, and a blocking plate may be constructed thereto to prevent from being covered by concrete when concrete is poured.

A plurality of protruding portions 102b may be formed radially from a central portion of the guide beam 102. Also, each of the protruding portions 102b may have an H-beam shape, and the coupling slot 108 for coupling the temporary buoyancy tank 110 may be coupled to a side portion of the protruding portion 102b.

The damping plate 104 is a structure having a circular plate shape. The damping plate 104 may have a diameter greater than an outer diameter of the upper structure 30 to thereby damp a vertical heaving in a step of installing the offshore wind power generation floating body 10 in a state of standing on the sea.

Also, a plurality of base anchors 104a for fixing a concrete block mounting structure 202 that will be described later may protrude from the top surface of the damping plate 104. Also, when a plurality of drainage holes 104b for damping movement of the offshore wind power generation floating body 10 as seawater flows in and out therethrough when the offshore wind power generation floating body 10 is vertically heaved may be defined in the top surface of the damping plate 104.

Here, since the damping plate 104 is a circular structure having an extremely greater diameter, the damping plate 104 may be manufactured by concrete curing instead of manufacturing by a steel frame structure. However, the damping plate 104 has a limitation in that the damping plate 104 hardly floats on the sea surface because of low buoyancy thereof when coupled with the upper structure 30 in a state of floating on the sea surface. When an additional space is designed to a lower end of the damping plate 104 to avoid the above-described limitation, the center of gravity of the offshore wind power generation floating body 10 may not be lowered. Thus, embodiments of the present invention provide temporary buoyancy to the lower structure 20 by coupling the temporary buoyancy tank 110 and the lower structure 20 including the damping plate 104 and remove the temporary buoyancy tank 110 after the lower structure 20 and the upper structure are coupled.

A Step of Coupling the Temporary Buoyancy Tank 110

Figure 5:
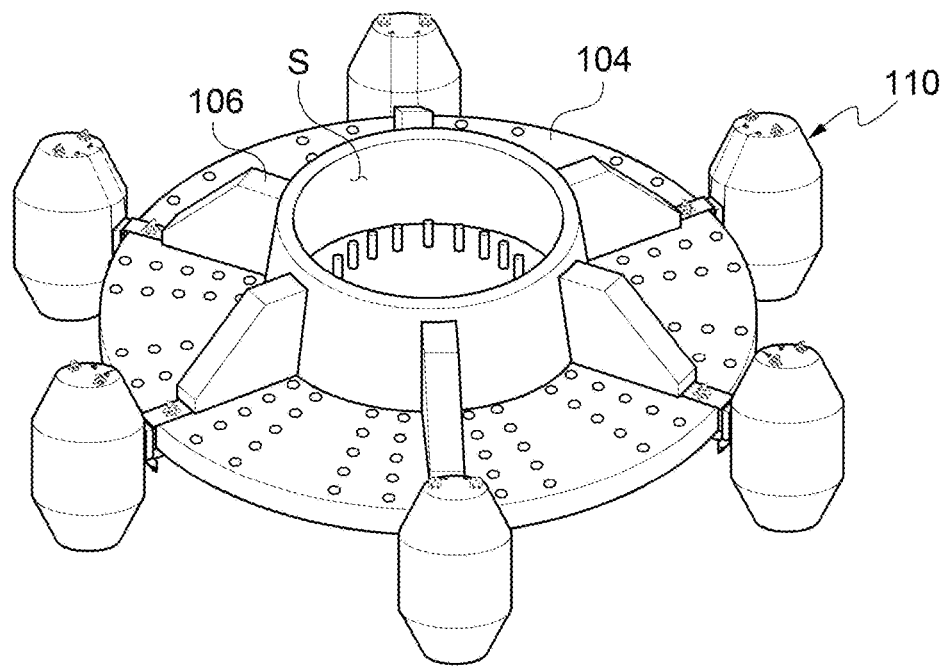
FIG. 5 is a view illustrating a state in which a temporary buoyancy tank is coupled to the lower structure according to an embodiment of the present invention.
Figure 6:
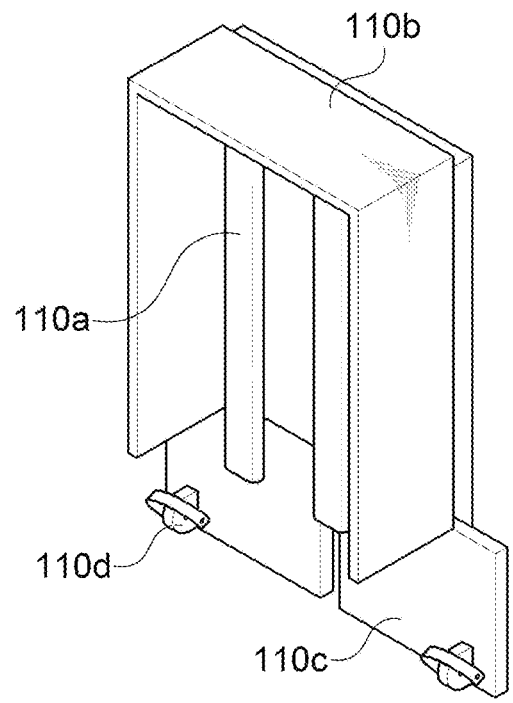
FIG. 6 is a view illustrating an outer surface of the temporary buoyancy tank according to an embodiment of the present invention.
Figure 7:
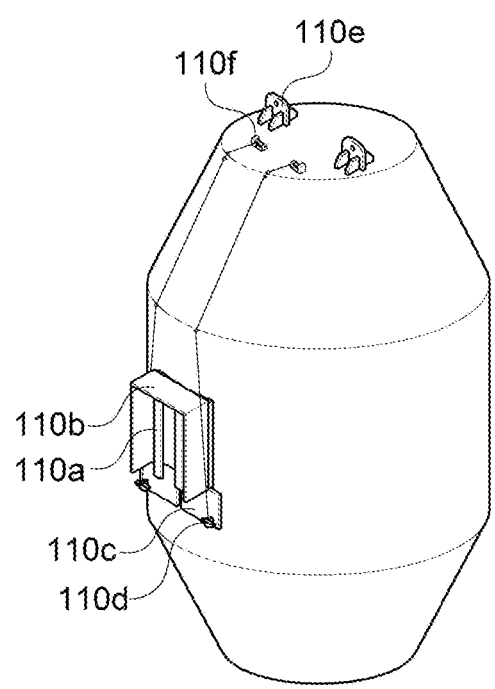
FIG. 7 is a view illustrating the outer surface of the temporary buoyancy tank according to an embodiment of the present invention.

FIGS. 5 to 7 are views for explaining a step of coupling the temporary buoyancy tank 110 according to an embodiment of the present invention. Specifically, FIG. 5 is a view illustrating a state in which the temporary buoyancy tank 110 is coupled to the lower structure 20 according to an embodiment of the present invention, and FIGS. 6 and 7 are views illustrating an outer surface of the temporary buoyancy tank 110 according to an embodiment of the present invention.

The temporary buoyancy tank 110 is a structure having a buoyancy (e.g., about 770 tons) enough to floating the damping plate 104 having a preset weight (e.g., about 800 tons) on the seawater. Although six temporary buoyancy tanks 110 are illustrated for convenience of description in FIG. 5, the embodiment of the present invention is not particularly limited to the number of the temporary buoyancy tanks 110.

As described above, the coupling slot 108 for coupling the temporary buoyancy tank 110 may be coupled to the protruding portion 102b having the H-beam shape. Also, a rod 110a, an impact absorbing plate 110b, a folding-type blocking plate 110c, a towing padeye 110d and 110e, and a winch 110f may be installed on an outer surface of the temporary buoyancy tank 110.

Referring to FIG. 6, the rod 110a may be provided in plurality on the outer surface of the temporary buoyancy tank 110 and inserted to the coupling slot 108.

The impact absorbing plate 110b may be formed outside the rod 110a to fix the temporary buoyancy tank 110 so that the temporary buoyancy tank 110 is not escaped to the left or right sides.

The folding-type blocking plate 110c may be formed below the rod 110a and folded in one direction so that the temporary buoyancy tank 110 is not escaped from the coupling slot 108. The folding-type blocking plate 110c may be folded inward to fix the temporary buoyancy tank 110 in a state in which the temporary buoyancy tank 110 is fixed to the rod 110a so that the temporary buoyancy tank 110 is not escaped downward and opened when buoyancy of the temporary buoyancy tank 110 is not necessary to be maintained as in FIG. 6. In this case, the temporary buoyancy tank 110 in may be separated and remove from the rod 110a by a crane (not shown).

The towing padeye 110d is a padeye connected with the winch 110f and used to open and close the folding-type blocking plate 110c. The winch 110f may be disposed at an upper side of the temporary buoyancy tank 110, and a wire connected to the winch 110f may be connected to the towing padeye 110d. Thus, the folding-type blocking plate 110c may be folded by pulling the towing padeye 110d through the wire connected to the winch 110f, and on the contrary, the folding-type blocking plate 110c may be opened by releasing the wire connected to the winch 110f.

Also, the towing padeye 110e used for installing the temporary buoyancy tank 110 may be installed at the upper side of the temporary buoyancy tank 110. A wire connected to the crane may lift the temporary buoyancy tank 110 through the towing padeye 110e, and thus the temporary buoyancy tank 110 may be coupled to the coupling slot 108.

A Step of Installing the Concrete Block Mounting Structure 202

As described above, when the temporary buoyancy tank 110 is coupled to the lower structure 20, a structure capable of mounting a concrete block 416, which will be described later, before the lower structure 20 is launched may be additionally installed to the lower structure 20.

Figure 8:
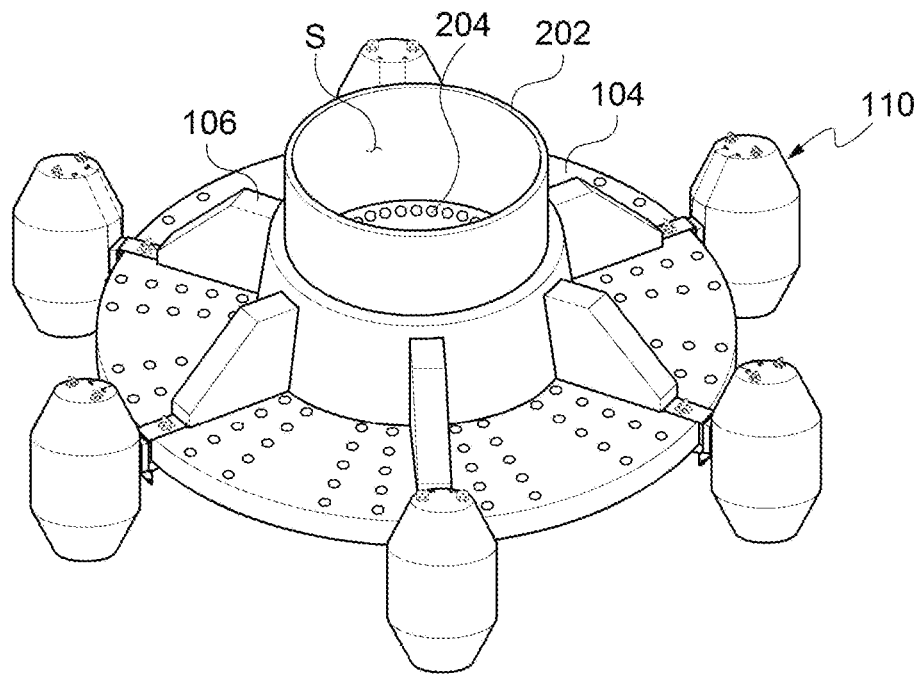
FIG. 8 is a view illustrating a process of seating and coupling a concrete block mounting structure to an empty space of a slot for fixing an upper structure according to an embodiment of the present invention.
Figure 9:
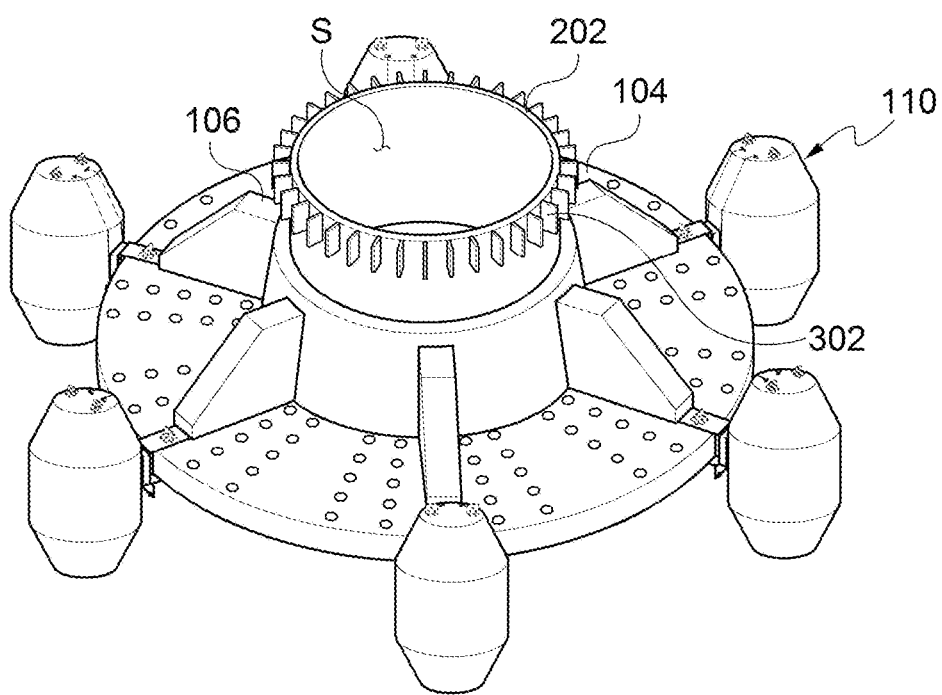
FIG. 9 is a view illustrating a process of filling mortar into the concrete block mounting structure according to an embodiment of the present invention.

FIGS. 8 to 9 are views for explaining a step of installing the concrete block mounting structure 202 according to an embodiment of the present invention. Specifically, FIG. 8 is a view illustrating a process of seating and coupling the concrete block mounting structure 202 to an empty space of the upper structure fixing slot 106 according to an embodiment of the present invention, and FIG. 9 is a view illustrating a process of filling mortar into the concrete block mounting structure 202 according to an embodiment of the present invention.

Referring to FIG. 8, the concrete block mounting structure 202 may be seated in the empty space S of the upper structure fixing slot 106. The concrete block mounting structure 202 may have a cylindrical shape having an opened upper portion. Also, for example, the concrete block mounting structure 202 may be formed by a rigid body made of a concrete material.

Here, a plurality of base anchors 104a may protrude from the top surface of the damping plate 104, and as the plurality of base anchors 104a pass through the concrete block mounting structure 202 and then are coupled with anchor bolts 204, the concrete block mounting structure 202 may be fixed.

Referring to FIG. 9, mortar may be filled into the concrete block mounting structure 202. Thus, the concrete block mounting structure 202 to which a concrete block 416 that will be described later is mounted may have a flat bottom.

Also, as illustrated in FIG. 9, a plurality of connection plates 302, which are spaced apart from each other, may be formed on an outer surface of the concrete block mounting structure 202. Each of the connection plates 302 is a component used for coupling with the upper structure 30. Also, as will be described later, the connection plate 302 may be temporarily used to fix the lower structure 20 before coupled with the upper structure 30.

A Step of Transporting the Lower Structure 20 on the Sea

Figure 10:
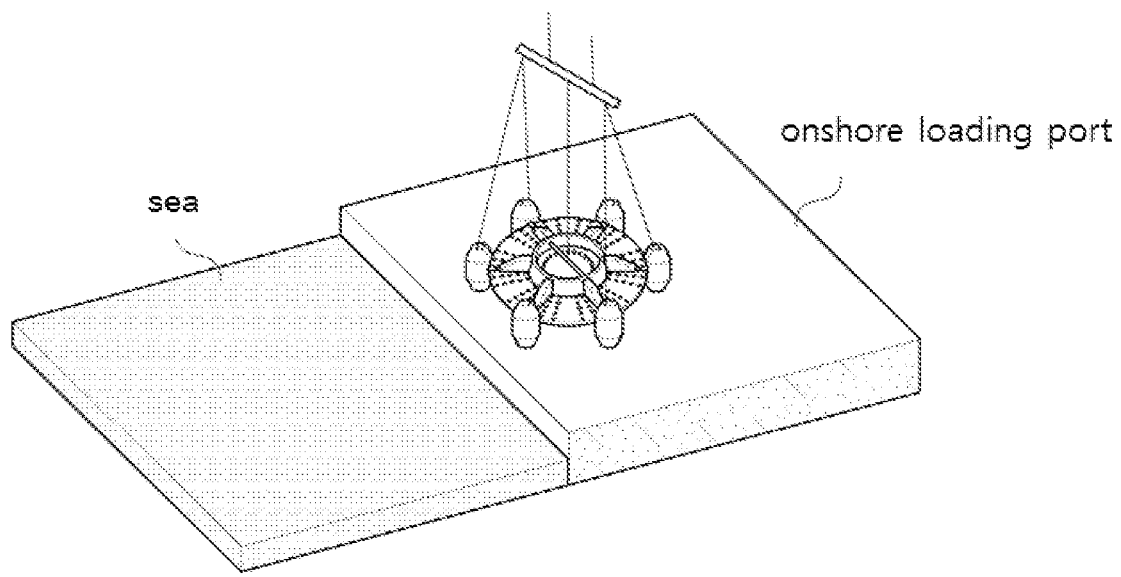
FIG. 10 is a view illustrating a process of launching the lower structure from an onshore loading port according to an embodiment of the present invention.
Figure 11:
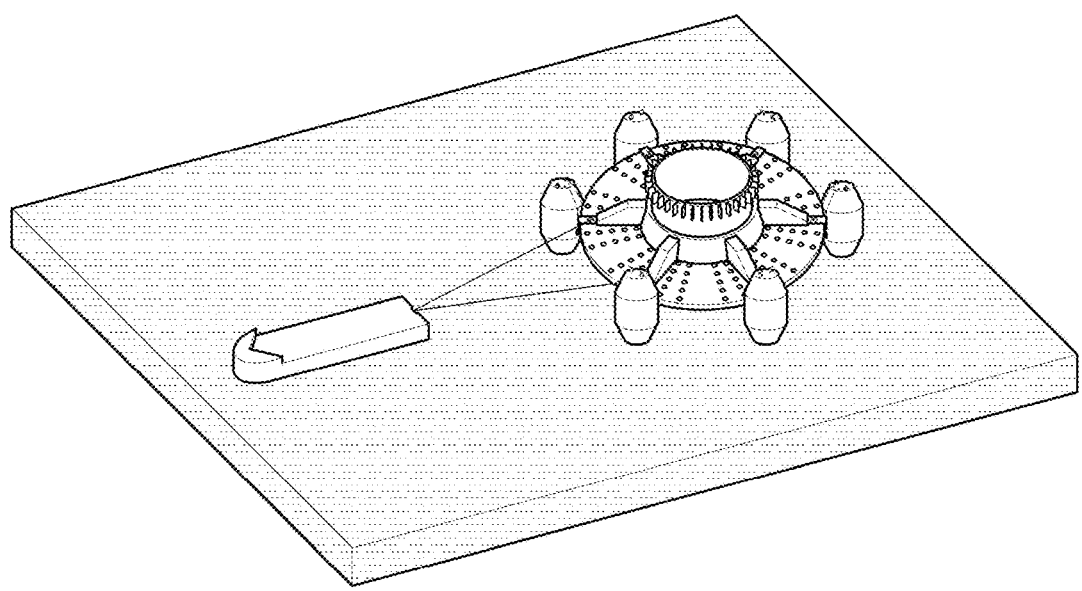
FIG. 11 is a view illustrating a process of transporting the lower structure on the sea to a destination by a towing vessel according to an embodiment of the present invention.

FIGS. 10 to 11 are views for explaining a step of offshore transportation of the lower structure 20 according to an embodiment of the present invention. Specifically, FIG. 10 is a view illustrating a process of launching the lower structure 20 from an onshore loading port according to an embodiment of the present invention, and FIG. 11 is a view illustrating a process of transporting the lower structure 20 on the sea to a destination by a towing vessel according to an embodiment of the present invention.

Referring to FIG. 10, the lower structure 20 may be coupled with the temporary buoyancy tank 110 and the concrete block mounting structure 202, and then towed by the crane and launched to the sea.

Referring to FIG. 11, the lower structure 20 coupled with the temporary buoyancy tank 110 and the concrete block mounting structure 202 may be towed by the towing vessel and transported on the sea to the destination.

A Step of Fixing the Lower Structure 20 and Seating the Concrete Block 416

Figure 12:
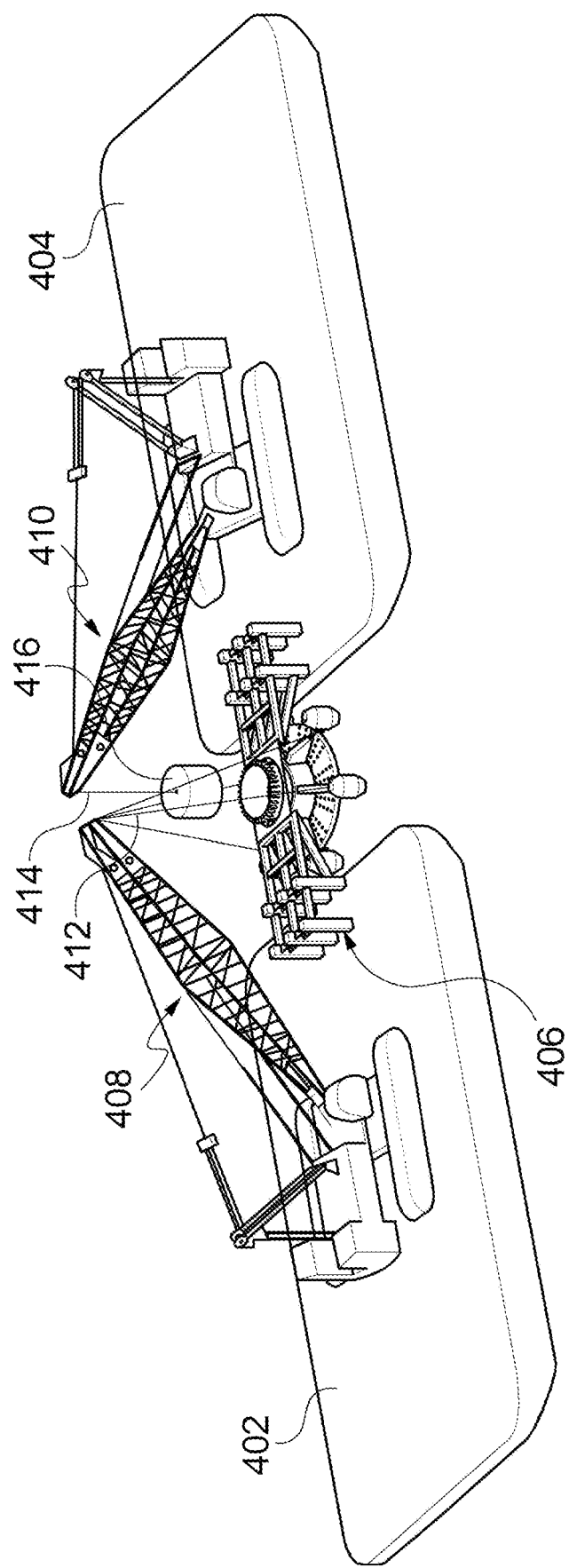
FIG. 12 is a view illustrating a process of fixing the lower structure between a first work barge and a second work barge by a link bridge according to an embodiment of the present invention.
Figure 13:
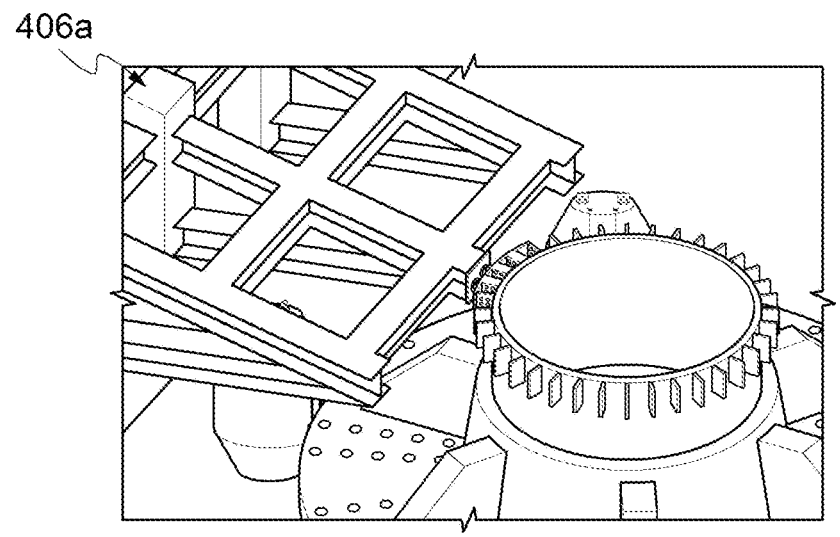
FIG. 13 is a view illustrating a process of coupling the link bridge to a connection plate through a bolt according to an embodiment of the present invention.
Figure 14:
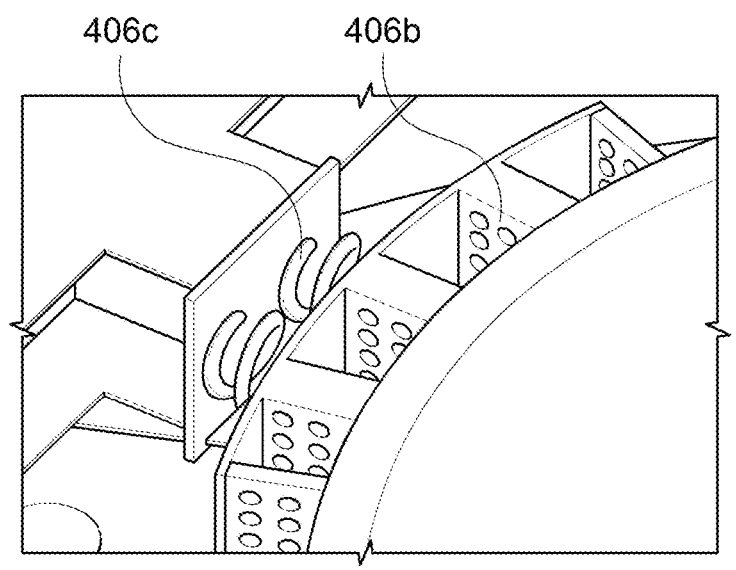
FIG. 14 is a view illustrating a spring structure according to an embodiment of the present invention.
Figure 15:
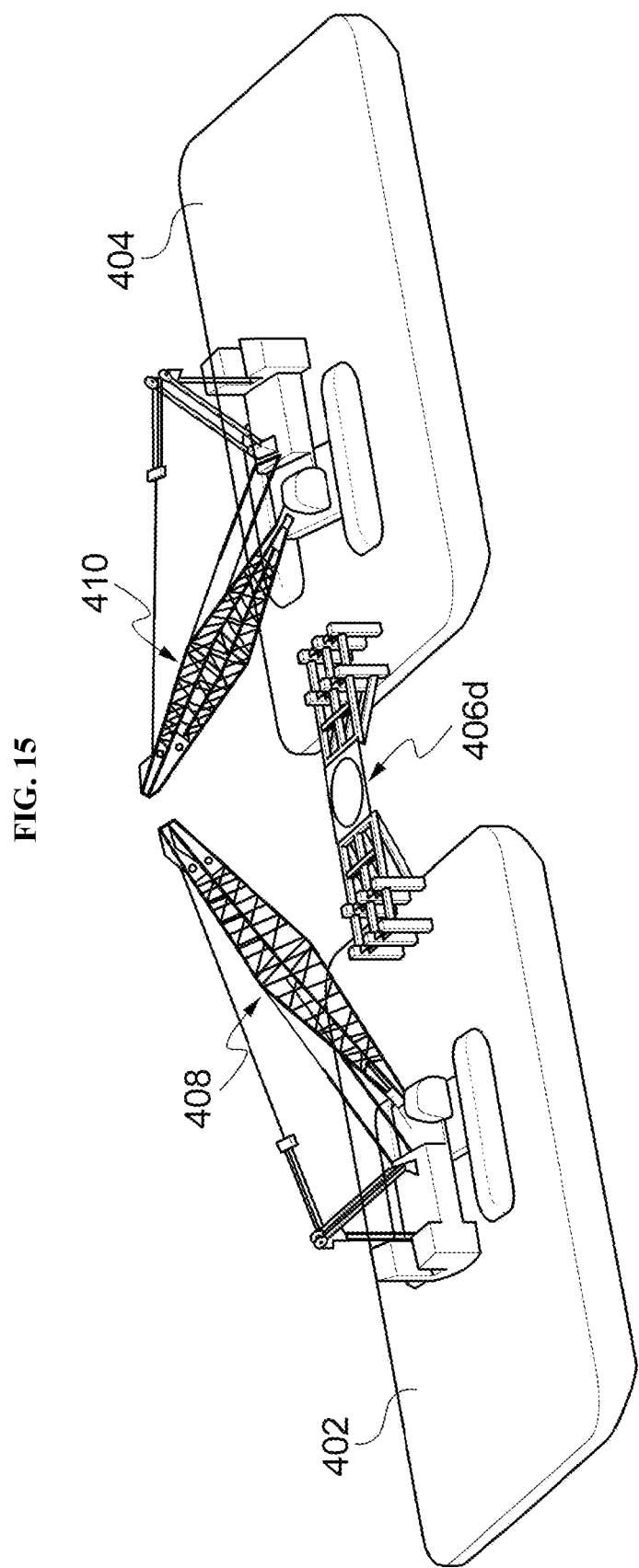
FIG. 15 is a view illustrating a process of installing a worktable according to an embodiment of the present invention.
Figure 16:
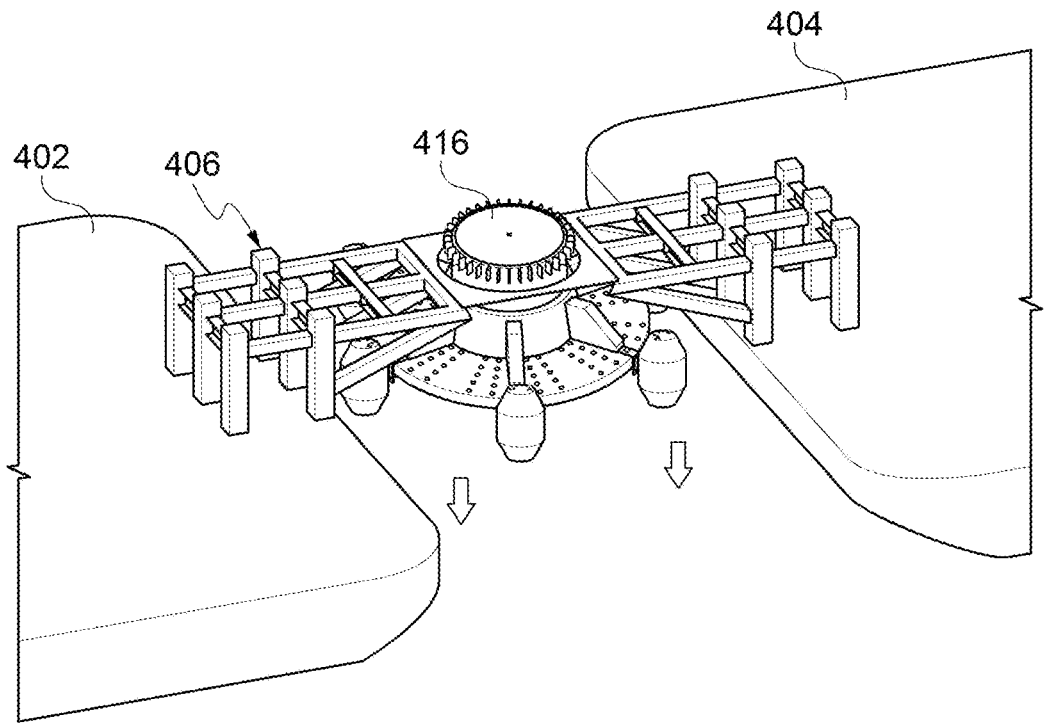
FIG. 16 is a view illustrating a process of seating a concrete block on the concrete block mounting structure according to an embodiment of the present invention.

FIGS. 12 to 16 are views for explaining a step of fixing the lower structure 20 and a step of seating the concrete block 416 according to an embodiment of the present invention. Specifically, FIG. 12 is a view illustrating a process of fixing the lower structure 20 between a first work barge 402 and a second work barge 404 by a link bridge 406 according to an embodiment of the present invention, FIG. 13 is a view illustrating a process of coupling the link bridge 406 to the connection plate 302 through a bolt according to an embodiment of the present invention, FIG. 14 is a view illustrating a spring structure 406c according to an embodiment of the present invention, and FIG. 15 is a view illustrating a process of installing a worktable according to an embodiment of the present invention. Also, FIG. 16 is a view illustrating a process of seating the concrete block 416 on the concrete block mounting structure 202 according to an embodiment of the present invention.

Referring to FIG. 12, the lower structure 20 is transported on the sea to the destination, and then the first work barge 402 and the second work barge 404 move around the lower structure 20. Here, the first work barge 402 may transport a first crane 408 on the sea, and the second work barge 404 may transport a second crane 410, the concrete block 416, and the upper structure 30 on the sea. The first work barge 402 and the second work barge 404 may be arranged with the lower structure 20 therebetween. Thereafter, the lower structure 20 may be fixed by the link bridge 406 connected to each of the first work barge 402 and the second work barge 404. The link bridge 406 is a structure connected to the first work barge 402 and the second work barge 404 and capable of fixing the lower structure 20.

Referring to FIGS. 13 and 14, as one end 406b of the link bridge 406, which protrudes from the first work barge 402, and the other end of the link bridge 406, which protrudes from the second work barge 404, are coupled to the connection plates 302, respectively, formed on an outer surface of the concrete block mounting structure 202, the lower structure 20 may be fixed by the link bridge 406. For example, the one end 406b and the other end of the link bridge 406 may be coupled to the connection plates 302 through a bolt.

Also, the spring structure 406c for relieving an impact caused by waves may be installed on one end and the other end of the link bridge 406. The one end 406b of the link bridge 406 may protrude from a column 406a of the link bridge 406, and the spring structure 406c may be installed at a position spaced a predetermined distance from the column 406a. The spring structure 406c may relieve the impact caused by waves by providing an elastic force to the lower structure 20.

Referring to FIG. 15, the worktable 406d may be installed between the one end 406b and the other end of the link bridge 406. The worktable 406d is a structure for providing a working space of riveting (or bolting) for connecting the connection plate 302 formed on the outer surface of the concrete block mounting structure 202 and a connection structure 502 that will be described later. The worktable 406d may include a circular open space having a diameter greater than an outer diameter of the upper structure 30. The link bridge 406 including the worktable 460d may be installed by the first crane 408 or the second crane 410.

Referring to FIG. 12 again, after the worktable 460d is installed, and then the concrete block 416 may be seated on the concrete block mounting structure 202. Specifically, in a state in which a plurality of first wires 412 of the first crane 408 seated on the first work barge 402 are connected to the lower structure 20 to maintain a tension equal to or greater than a set magnitude, the concrete block 416 connected to a second wire 414 of the second crane 410 seated on the second work barge 404 may be seated on the concrete block mounting structure 202. Here, the plurality of first wires 412 of the first crane 408 seated on the first work barge 402 may be connected to a towing padeye 102a of the guide beam 102 to maintain a tension having a sufficient magnitude so that the lower structure 20 does not sink due to a weight of the concrete block 416.

Referring to FIG. 16, the coupling between the connection plates 302 and one end and the other end of the link bridge 406 may be released by the first crane 408 and the second crane 410. Here, the first work barge 402 and the second work barge 404 may sink to adjust a work height of the first work barge 402 and the second work barge 404 by a ballast. That is, a height of the work space may be adjusted while the two work barges 402 and 404 sink through the ballast in order to secure a space for connecting the connection plate 302 and the connection structure 502.

A Step of Coupling the Upper Structure 30

Figure 17:
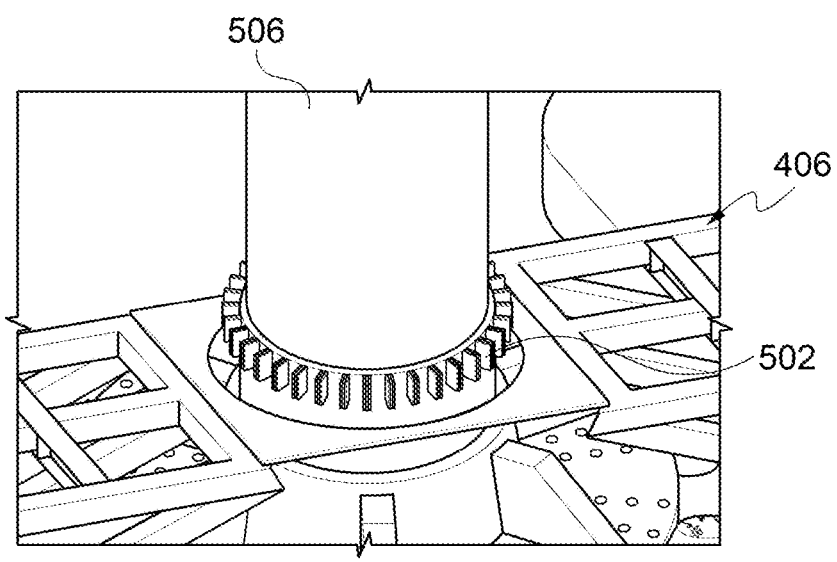
FIG. 17 is a view illustrating a process of coupling the upper structure with the concrete block mounting structure 202 according to an embodiment of the present invention.
Figure 18:
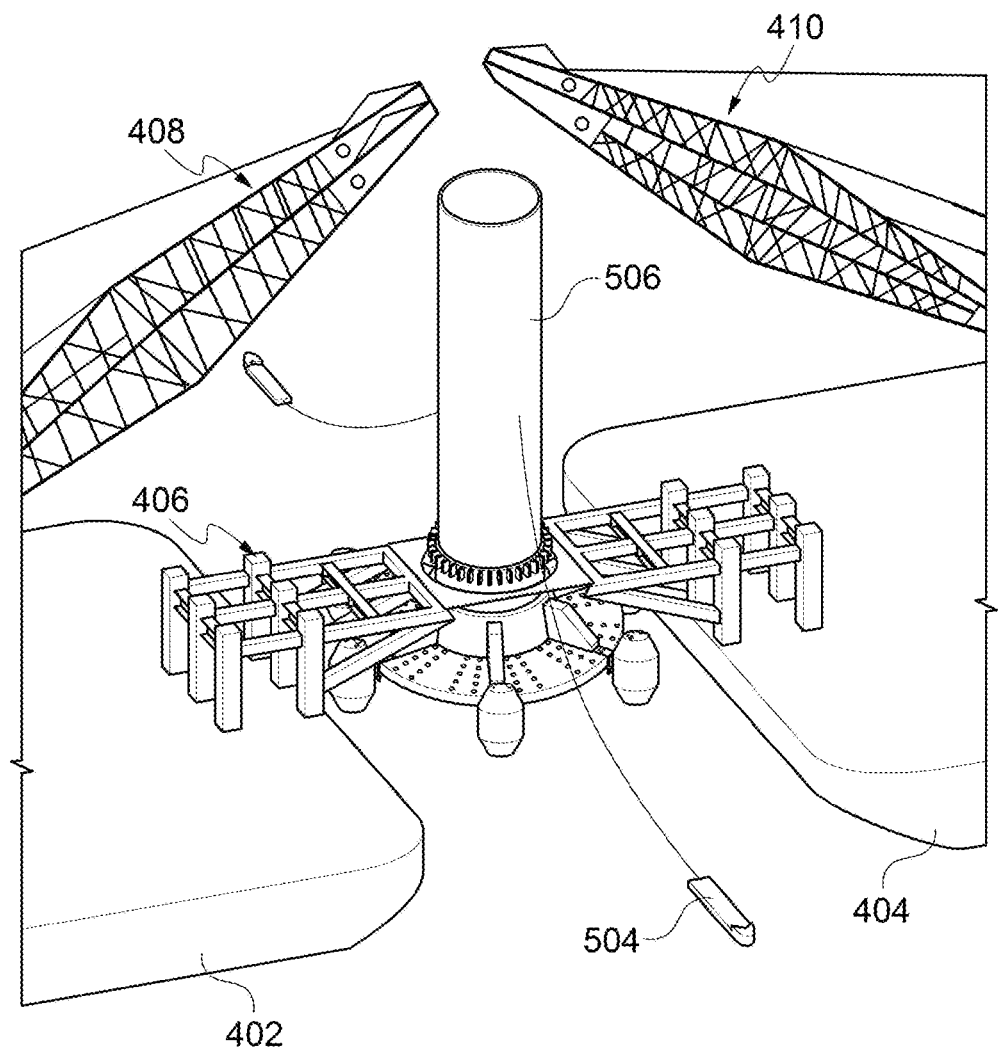
FIG. 18 is a view illustrating a process of adjusting a tension of a third wire by a towing vessel to maintain standing of the upper structure and the lower structure according to an embodiment of the present invention.
Figure 19:
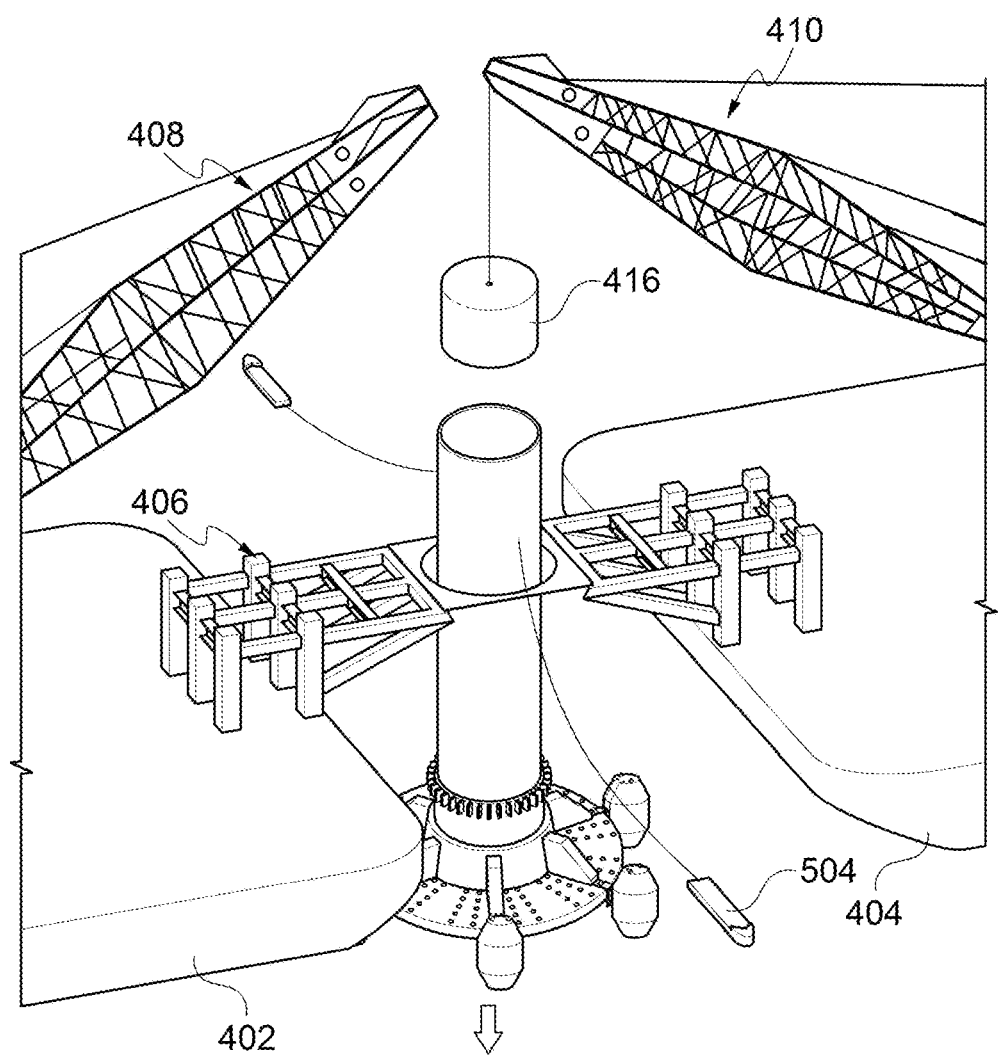
FIG. 19 is a view illustrating a process of mounting the concrete block to the upper structure according to an embodiment of the present invention.

FIGS. 17 to 19 are views for explaining a step of coupling the upper structure 30 according to an embodiment of the present invention. Specifically, FIG. 17 is a view illustrating a process of coupling the upper structure 30 with the concrete block mounting structure 202 according to an embodiment of the present invention, FIG. 18 is a view illustrating a process of adjusting a tension of a third wire by the towing vessel to maintain standing of the upper structure 30 and the lower structure 20 according to an embodiment of the present invention, and FIG. 19 is a view illustrating a process of mounting the concrete block 416 to the upper structure 30 according to an embodiment of the present invention.

Referring to FIG. 17, the upper structure 30 may have a shape corresponding to the concrete block mounting structure 202, and be towed by the second crane 410 and coupled with the concrete block mounting structure 202. Here, a plurality of connection structures 502 may be formed on an outer surface of the upper structure 30, and as the plurality of connection structures 502 are assembled with the connection plates 302, the upper structure 30 may be coupled with the concrete block mounting structure 202. The connection structure 502 may have a shape corresponding to the connection plate 302.

When assembly of the connection structure 502 and the connection plate 302 is completed, the first crane 408 may slowly release the tension of the first wire 412 connected to the lower structure 20 and appropriately support the lower structure so that the upper structure 30 is not inclined.

Referring to FIG. 18, a plurality of third wires 506 may be connected to the outer surface of the upper structure 30, and the third wires 506 may be connected to a plurality of towing vessels, respectively. Thus, the upper structure 30 may maintain standing instead of being inclined by the third wire 506.

Referring to FIG. 19, after the assembling of the connection structure 502 and the connection plate 302 is completed, the temporary buoyancy tank 110 may be removed from the lower structure 20 through the second wire 414. Specifically, in a state in which the second wire 414 of the second crane 410 is connected to the towing padeye 110e of the temporary buoyancy tank 110, the folding-type blocking plate 110c is opened by using the winch 110f of the temporary buoyancy tank 110 to remove the temporary buoyancy tank 110 from the lower structure 20. Thereafter, when the first crane 408 releases the tension of the first wire 412, the lower structure 20 and the upper structure 30 naturally sink below the seawater surface and find an equilibrium position. Here, the towing vessels may adjust the tension of the third wire 506 to maintain the standing of the lower structure 20 and the upper structure 30 while the lower structure 20 and the upper structure 30 sink below the seawater surface.

Also, when the lower structure 20 and the upper structure 30 sink below the seawater surface and maintain equilibrium, the lower structure 20 and the upper structure 30 may sink by mounting an additional concrete block 416 to an inner space of the upper structure 30.

A Step of Coupling the Liquid Ballast Part 40 and a Column 50 for Buoyancy

Figure 20:
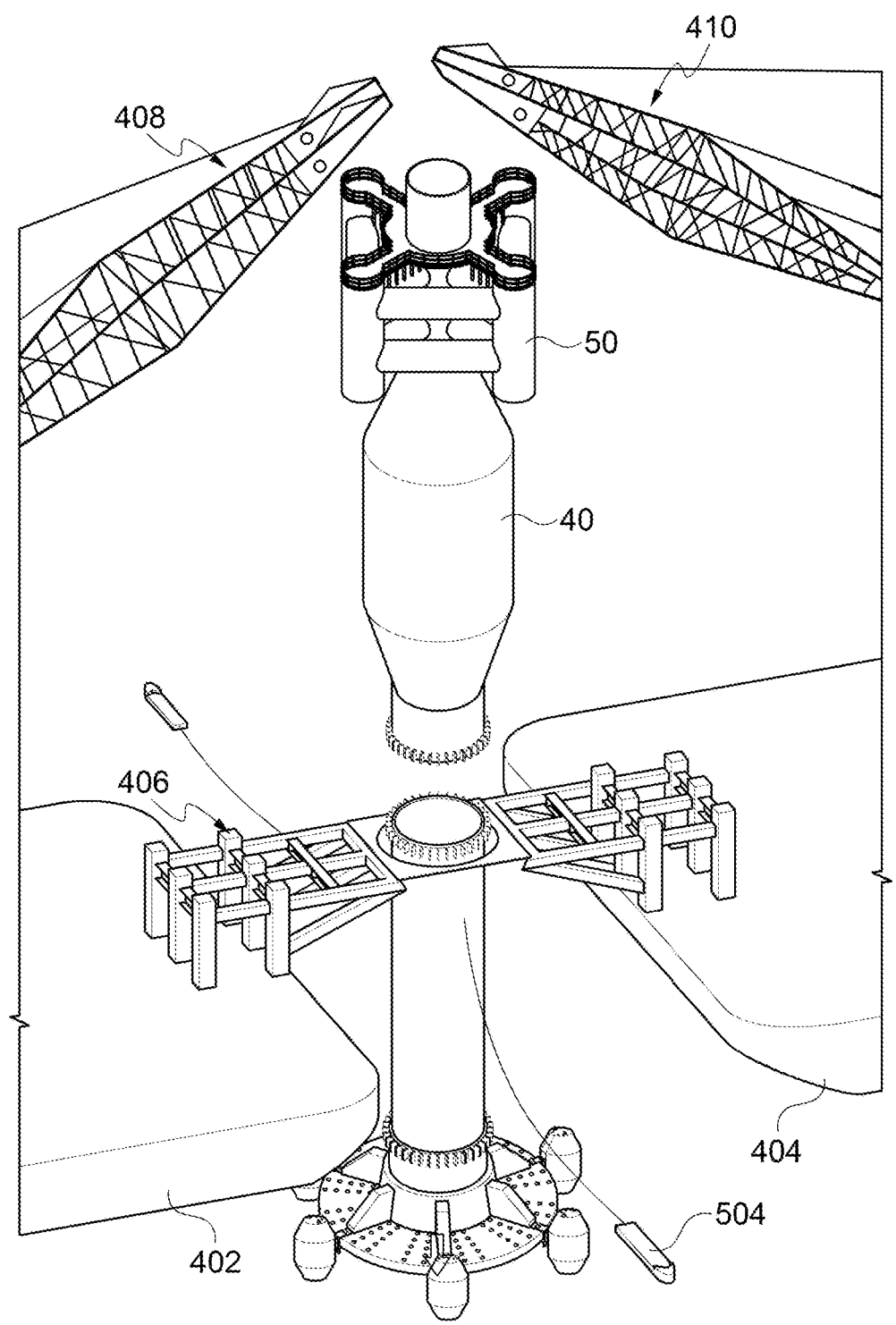
FIG. 20 is a view illustrating a process of assembling a liquid ballast part and a column for buoyancy with the upper structure according to an embodiment of the present invention.
Figure 21:
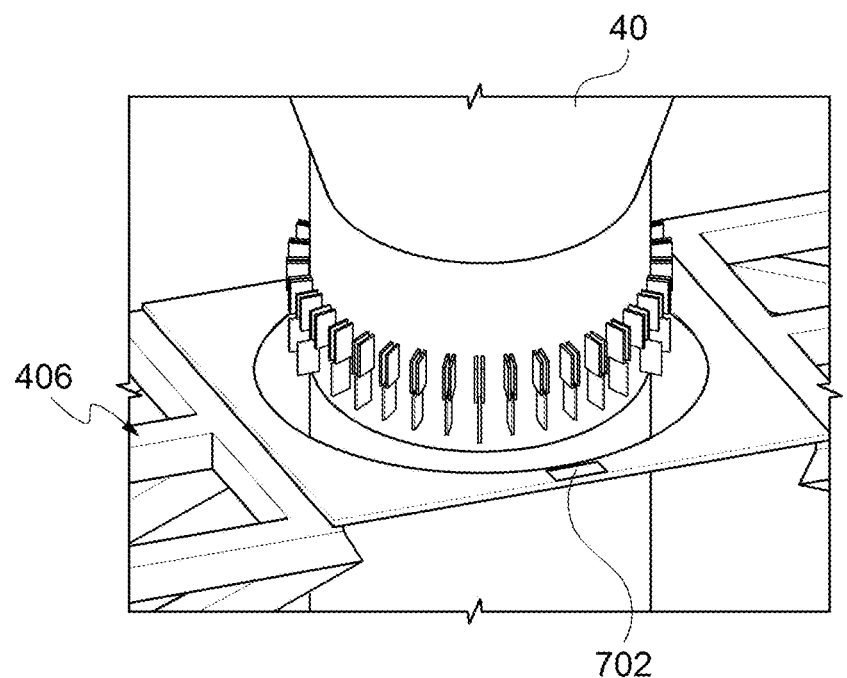
FIG. 21 is a view illustrating a process of disassembling a worktable according to an embodiment of the present invention.

FIGS. 20 to 21 are views for explaining a step of coupling the liquid ballast part 40 and the column 50 for buoyancy according to an embodiment of the present invention. Specifically, FIG. 20 is a view illustrating a process of assembling the liquid ballast part 40 and the column 50 for buoyancy with the upper structure 30 according to an embodiment of the present invention, and FIG. 21 is a view illustrating a process of disassembling the worktable 406d according to an embodiment of the present invention.

Referring to FIG. 20, after the work height is adjusted by the ballast of the two barges 402 and 404, the liquid ballast part 40 and the column 50 for buoyancy may be assembled with the upper structure 30 in the same method as the above-described method. As illustrated in FIG. 20, as the connection plate of the upper structure 30 provided on a lower end of the liquid ballast part 40 and the above-described connection plate of the upper structure 30 are assembled with each other, the liquid ballast part 40 and the column 50 for buoyancy may be assembled with the upper structure 30. In the above-described method, assembly of the offshore wind power generation floating body 10 is completed.

Referring to FIG. 21, when the assembly of the offshore wind power generation floating body 10 is completed, the worktable 406d may be disassembled by unlocking a bolt 702 fixing the worktable 406d before the crane towing the upper structure 30 is removed. Also, when the worktable 406d is disassembled, the offshore wind power generation floating body 10 may be completely installed by connecting a mooring wire (not shown) to a fairlead (not shown) so that the offshore wind power generation floating body 10 is not reversed and completing a mooring installation work by using a mooring installation vessel (not shown).

Although the embodiments of the present invention have been described, it is understood that the present invention should not be limited to these embodiments but various changes and modifications can be made by one ordinary skilled in the art within the spirit and scope of the present invention as hereinafter claimed. Therefore, the scope of this disclosure is defined not by the detailed description of the invention but by the appended claims, and all differences within the scope will be construed as being included in the present disclosure.

What is claimed is:

1. A method for installing offshore wind power generation floating body, comprising:
    manufacturing a lower structure comprising a damping plate having a circular plate shape, a guide beam configured to support each of a top surface and a bottom surface of the damping plate and comprising a plurality of protruding portions formed on a side surface of the damping plate, and a slot for fixing an upper structure, which is formed in the top surface of the damping plate and has an empty space at a central portion thereof;
    coupling a temporary buoyancy tank to each of the plurality of protruding portions;
    installing a concrete block mounting structure in the empty space of the slot for fixing the upper structure;
    transporting the lower structure on the sea until a destination by a towing vessel;
    fixing the lower structure between a first work barge and a second work barge by a link bridge connected to each of the first work barge and the second work barge; and
    seating a concrete block connected to a second wire of a second crane seated on the second work barge on the concrete block mounting structure in a state in which a plurality of first wires of a first crane seated on the first work barge are connected to the lower structure to maintain a tension equal to or greater than a set magnitude.

2. The method of claim 1, wherein the coupling comprises:
    coupling a slot for coupling, which is for coupling the temporary buoyancy tank to the protruding portion having an H-beam shape;
    installing a rod on an outer surface of the temporary buoyancy tank;
    forming an impact absorbing plate for fixing the temporary buoyancy tank on the outside of the rod;
    inserting the rod to the slot for coupling; and
    folding a folding-type blocking plate in one direction, which is formed below the rod so that the temporary buoyancy tank is not escaped from the slot for coupling.

3. The method of claim 1, wherein the installing of the concrete block mounting structure in the empty space of the slot for fixing the upper structure comprises:
    seating the concrete block mounting structure in the empty space;
    coupling a plurality of base anchors protruding from the top surface of the damping plate with anchor bolts after passing through the concrete block mounting structure; and
    filling mortar into the concrete block mounting structure.

4. The method of claim 1, wherein the concrete block mounting structure has a cylindrical shape having an opened upper portion, and
    a plurality of connection plates, which are spaced apart from each other, are formed on an outer surface of the concrete block mounting structure.

5. The method of claim 4, wherein the fixing of the lower structure by the link bridge fixes the lower structure by the link bridge as one end of the link bridge, which protrudes from the first work barge, and the other end of the link bridge, which protrudes from the second barge, are coupled to the connection plates, respectively.

6. The method of claim 5, wherein a spring structure for relieving an impact caused by a wave is installed on each of one end and the other end of the link bridge.

7. The method of claim 5, further comprising: after the seating of the concrete block on the concrete block mounting structure:
    releasing coupling between the connection plates and the one end and the other end of the link bridge;
    allowing the first work barge and the second work barge to sink by a ballast for work height adjustment of the first work barge and the second work barge; and
    coupling the upper structure having a shape corresponding to the concrete block mounting structure with the concrete block mounting structure.

8. The method of claim 7, wherein the coupling of the upper structure with the concrete block mounting structure couples the upper structure with the concrete block mounting structure as a plurality of connection structures formed on an outer surface of the upper structure are assembled with the connection plates.

9. The method of claim 7, further comprising, after the coupling of the upper structure with the concrete block mounting structure:
    removing the temporary buoyancy tank through the second wire of the second crane; and
    allowing the upper structure and the lower structure to sink below a seawater surface as a tension of the first wire of the first crane is released.

10. The method of claim 9, further comprising, after the coupling of the upper structure with the concrete block mounting structure:
    connecting a plurality of third wires to an outer surface of the upper structure;
    connecting the third wire to each of a plurality of towing vessels; and
    adjusting a tension of the third wire by the towing vessel connected with the third wire to maintain standing of each of the upper structure and the lower structure while the upper structure and the lower structure sink below the seawater surface.

* * * * *